US008646300B2

(12) United States Patent
Caporusso et al.

(10) Patent No.: US 8,646,300 B2
(45) Date of Patent: Feb. 11, 2014

(54) METHOD AND CONTROLLED MACHINE FOR CONTINUOUS BENDING

(75) Inventors: Alessandro Caporusso, Piedimonte San Germano (IT); Eugenio Schiarante, Altavilla Vicentina (IT); Giuseppe Roso, Santorso (IT)

(73) Assignee: CML International S.p.A., Piedimonte San Germano (FR) (IT)

( * ) Notice: Subject to any disclaimer, the term of this patent is extended or adjusted under 35 U.S.C. 154(b) by 189 days.

(21) Appl. No.: 12/867,300

(22) PCT Filed: Feb. 10, 2009

(86) PCT No.: PCT/IT2009/000049
§ 371 (c)(1),
(2), (4) Date: Dec. 22, 2010

(87) PCT Pub. No.: WO2009/101649
PCT Pub. Date: Aug. 20, 2009

(65) Prior Publication Data
US 2011/0094278 A1    Apr. 28, 2011

(30) Foreign Application Priority Data
Feb. 12, 2008  (IT) .............................. RM2008A0078

(51) Int. Cl.
*B21D 5/14*      (2006.01)

(52) U.S. Cl.
USPC ................ 72/173; 72/17.3; 72/18.1; 72/18.2; 72/18.6; 72/19.6; 72/19.7; 72/31.04; 72/31.05; 72/172; 72/226; 72/230; 72/306; 72/307

(58) Field of Classification Search
USPC ............. 72/17.3, 18.1, 18.2, 18.6, 19.6, 19.7, 72/31.04, 31.05, 172, 226, 230, 306, 307
See application file for complete search history.

(56) References Cited

U.S. PATENT DOCUMENTS

| 3,955,389 A | * | 5/1976 | Foster | ............................. 72/7.4 |
| 4,047,411 A | | 9/1977 | Foster | |
| 4,117,702 A | * | 10/1978 | Foster | ............................. 72/7.4 |

(Continued)

FOREIGN PATENT DOCUMENTS

| EP | 0 477 752 A1 | 4/1992 |
| JP | 62-033014 A | 2/1987 |
| WO | 2005/005071 A1 | 1/2005 |

OTHER PUBLICATIONS

International Search Report, dated Aug. 11, 2009, from corresponding PCT application.

*Primary Examiner* — Dana Ross
*Assistant Examiner* — Onekki Jolly
(74) *Attorney, Agent, or Firm* — Young & Thompson

(57) ABSTRACT

A method to check and control a roller bending machine for continuously bending an elongated workpiece at variable curvature radii in a bending machine using a series of rollers for bending, comprises the steps of measuring the distance of the elongated work piece in a point that is situated downstream the series of rollers for bending in successive instants, calculating a curvature radius of each bend section of the elongated workpiece, comparing the calculated curvature radius with the desired curvature radius and determining a difference between them, calculating the change of position to which an upstream roller has to be subjected in order to annul such a difference and operating the upstream roller on the base of the calculated change of position. A machine embodying the method is also described.

17 Claims, 2 Drawing Sheets

(56) References Cited

U.S. PATENT DOCUMENTS

| | | | |
|---|---|---|---|
| 4,232,540 A | 11/1980 | Cain et al. | |
| 4,530,226 A * | 7/1985 | Granzow et al. | 72/171 |
| 4,761,979 A * | 8/1988 | Kawaguchi et al. | 72/16.2 |
| 4,796,449 A * | 1/1989 | Berne | 72/8.3 |
| 4,893,489 A * | 1/1990 | Mason | 72/10.2 |
| 4,910,984 A * | 3/1990 | Young et al. | 72/14.7 |
| 5,187,959 A * | 2/1993 | Davi | 72/10.6 |
| 5,431,035 A * | 7/1995 | Sheen | 72/133 |
| 5,906,128 A * | 5/1999 | Del Fabro et al. | 72/161 |
| 6,044,675 A * | 4/2000 | Davi | 72/7.1 |
| 6,079,246 A * | 6/2000 | Caporusso et al. | 72/173 |
| 6,954,679 B1 * | 10/2005 | Takeda et al. | 700/165 |
| 7,325,427 B2 * | 2/2008 | Ingvarsson | 72/7.4 |
| 7,337,642 B2 * | 3/2008 | Lyons et al. | 72/129 |
| 7,458,243 B2 * | 12/2008 | Ruzovic et al. | 72/135 |
| 7,590,249 B2 * | 9/2009 | Jang et al. | 381/61 |
| 7,591,161 B2 * | 9/2009 | Green et al. | 72/11.2 |
| 2006/0175311 A1 | 8/2006 | Ingvarsson | |
| 2007/0233422 A1 | 10/2007 | Montanari | |
| 2009/0249851 A1 * | 10/2009 | Isaacs | 72/31.04 |

* cited by examiner

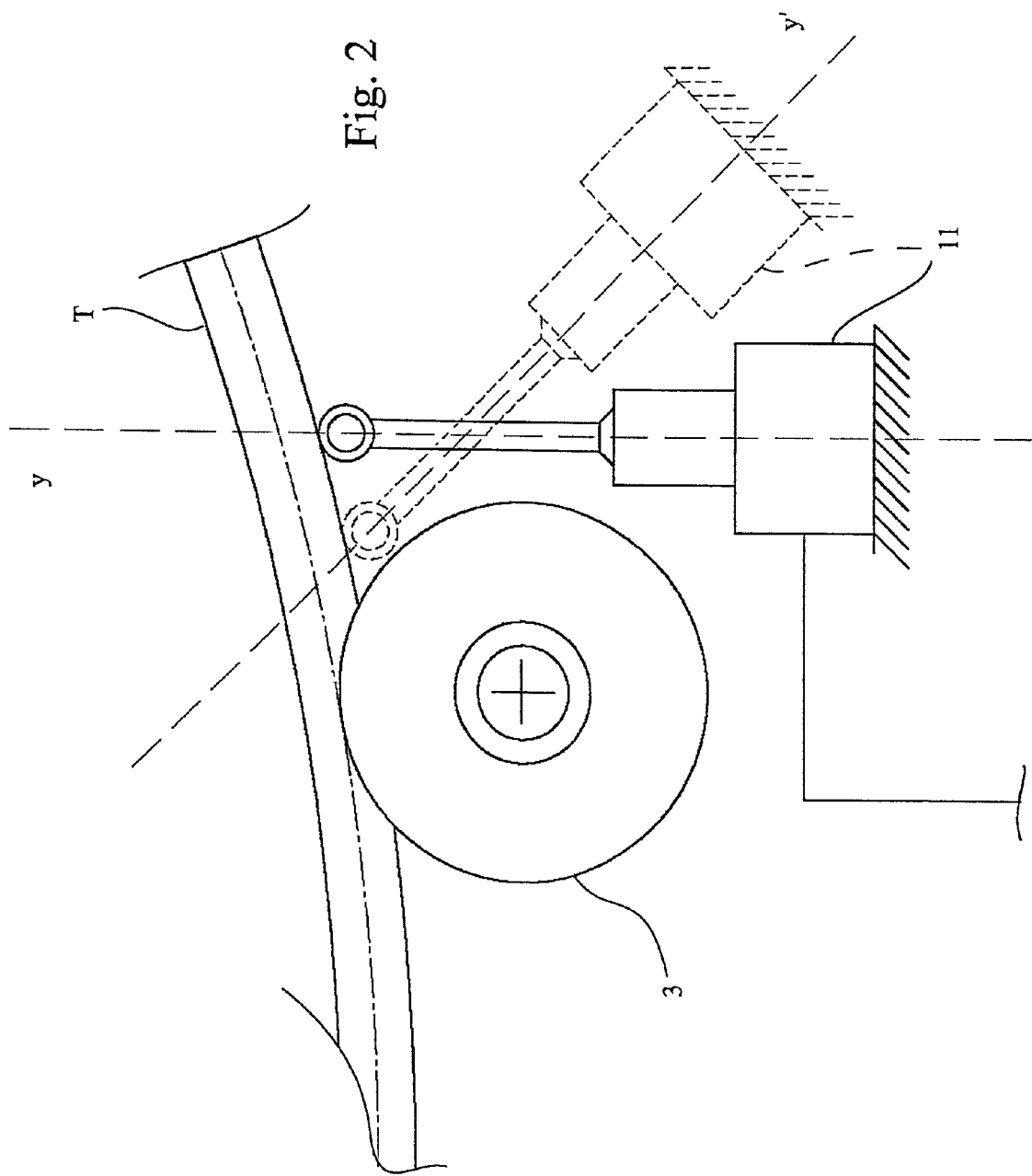

METHOD AND CONTROLLED MACHINE FOR CONTINUOUS BENDING

TECHNICAL FIELD

The present invention relates to a method to check and control a roller bending machine for continuously bending an elongated workpiece at variable curvature radii. Further the invention concerns a roller bending machine so controlled.

BACKGROUND ART

U.S. Pat. No. 4,761,979, which was granted to Mitsubishi Denki of Tokyo (Japan) describes a roller bending apparatus of a pyramidal kind, having a curvature measuring unit adapted to measure a radius of curvature of a workpiece comprising at least three probes mounted on a probe holder, at least one of the probes being a moving probe whose linear displacement produces a corresponding electrical output signal, with the rest of the probes being stationary probes. A drive cylinder of the curvature measuring unit moves the probe holder towards the workpiece until all of the probes firmly contact the surface of the workpiece, in which state the electrical output signal is applied to a calculating and display unit as a measured value, that is provided as an input value by an operator to a computer. The computer calculates a stroke measure of a machine top roller that is requested to obtain a desired curvature radius of the workpiece.

Further, the European patent N. 477 752, that was granted to Promau s.r.l. of Cesena (Italy) describes a roll bending machine for bending iron sheets that uses a three-point mechanical sensing device for the workpiece exiting the roll bending machine. This device enables the radius that the machine is conferring to the iron sheet to be checked, allowing one person to intervene for making necessary corrections.

European patent application EP 1 644 140 in the name of ORTIC AB of Borlange (Sweden) describes a method of process monitoring and controlling for continuous bending of an elongated workpiece to a predetermined radius by using three parallel contact-free distance meters of the laser transmitter type and by measuring the distances to the bent surface on the elongated workpiece, by calculating the actual curvature radius based on the fixed distances between the meters and the measured distances, and adjusting the bending machine in response to the relation between the calculated actual radius and the desired radius.

It is clear that in the above cited documents the actual radius of a section of an elongated workpiece is measured but the machine is corrected or adjusted while a workpiece section different from the measured one is bent. However, if the bend that one wants to obtain is a predetermined fixed radius bend, the method can be satisfying as it can imply that only a first bend section of the workpiece is of an actual bend radius different from the desired one. In this case, the damage can consist of throwing away that first bend section.

On the contrary, when one wants to bend an elongated workpiece at variable curvature radii, for example sections of a workpiece with a fixed radius that are separated by different radius connections or, generally, bend sections having a continuously varying radius, it is more advantageous to measure a radius of the elongated workpiece section that has a curvature radius near the radius of the bend section that the machine is working in that moment or straight after.

Consequently, a main object of the invention is to measure a curvature radius in a bend section that is not the actual curvature radius of a real bend section that is already formed, but that is the curvature radius of a bend section being formed by the machine.

Another object of the invention is to measure a curvature radius in a point nearest to the point of bending deformation by the machine, that is generally the third roller for the workpiece exiting the machine.

DISCLOSURE OF THE INVENTION

Therefore, the invention in a first aspect thereof provides a method to check and control a roller bending machine for continuously bending an elongated workpiece at variable curvature radii, the roller bending machine using a series of driving rollers for bending, the method comprising the following steps of:

measuring the distance of the elongated workpiece in one point that is situated downstream said series of driving rollers for bending and lays in a direction of one distance meter, the distance measurement being executed to obtain the distance between said one point and a fixed position of the distance meter in successive instants;

calculating a curvature radius of each bend section of the elongated workpiece;

comparing the calculated curvature radius with the desired curvature radius in said bend section having a position and a length that are measured concentrically to the elongated workpiece by means a length meter, and determining a difference between said calculated curvature radius and said desired curvature radius;

calculating the change of position to which an upstream roller has to be subjected in order to annul said difference between said calculated curvature radius and said desired curvature radius;

operating said upstream roller on the base of said calculated change of position.

In a first embodiment of the method of the present invention the calculation of the curvature radius of each bend section of the elongated workpiece is executed on the base of the change of position, with respect to the elongated workpiece to be bent, of at least one roller of said series of rollers for bending, and of the distance measured by the distance meter. In particular, the curve along which said elongated workpiece is bent is defined by means of a succession of third order polynomial functions, said functions being natural cubic splines, which need at least three points to be mathematically defined, said at least three points being obtained on the base of the change of position with respect to the elongated workpiece to be bent, of the roller being variable in its position, and of the distance measured by the distance meter, both constituting two points, the third point resulting in a Cartesian diagram as a change of the curvature or the angular coefficient of the chord as measured with respect to precedent detection.

In a second embodiment of the method of the present invention said calculation of the curvature radius of each bend section of the elongated workpiece is the calculation of an intermediate curvature radius of a bend section that is formed during said at least three successive instants, said intermediate radius being comprised between the bend radius in a first of said at least three instants and the bend radius in a last one of said at least three instants.

In a second aspect the invention provides a machine that is controlled for continuous bending an elongated workpiece at variable curvature radii, machine that uses a series of driving rollers for bending comprising:

one distance meter for measuring the distance of the elongated workpiece that is situated downstream said series of rollers for bending;

a computer that is coupled, among other, to the distance meter for calculating a radius of a bend section on the base of the measurement of said distance in successive instants, and comparing the calculated curvature radius with the desired curvature radius in said bend section;

the computer being coupled also to a length meter for measuring the length of said bend section concentrically to the elongated workpiece;

the computer being coupled also to operating means adapted to operate a roller of the series of driving rollers for bending in order to adjust it by means of a length meter on the base of a difference between said measured curvature radius and the desired curvature radius in said bend section.

In addition to an advantage of obtaining a more accurate value of correction, in particular with reference to bending operations for obtaining bend sections with variable curvature radii, the method and the machine according to the present invention have an advantage with respect to the previous art that three distance meters such as laser transmitters are not requested, but only one. Thus a consequent cost reduction is achieved.

Further, with respect to the three point-contact distance meters there are various advantages the most important of which is a greater accuracy, since the measurement is executed in one point and in one direction.

BRIEF DESCRIPTION OF DRAWINGS

The present invention will be described with reference to preferred embodiments thereof, taken in connection with the enclosed drawing, in which:

FIG. 2 shows in particular an enlarged detail of the machine in FIG. 1 in a modification thereof.

DESCRIPTION OF EMBODIMENTS OF INVENTION

Figure 1:
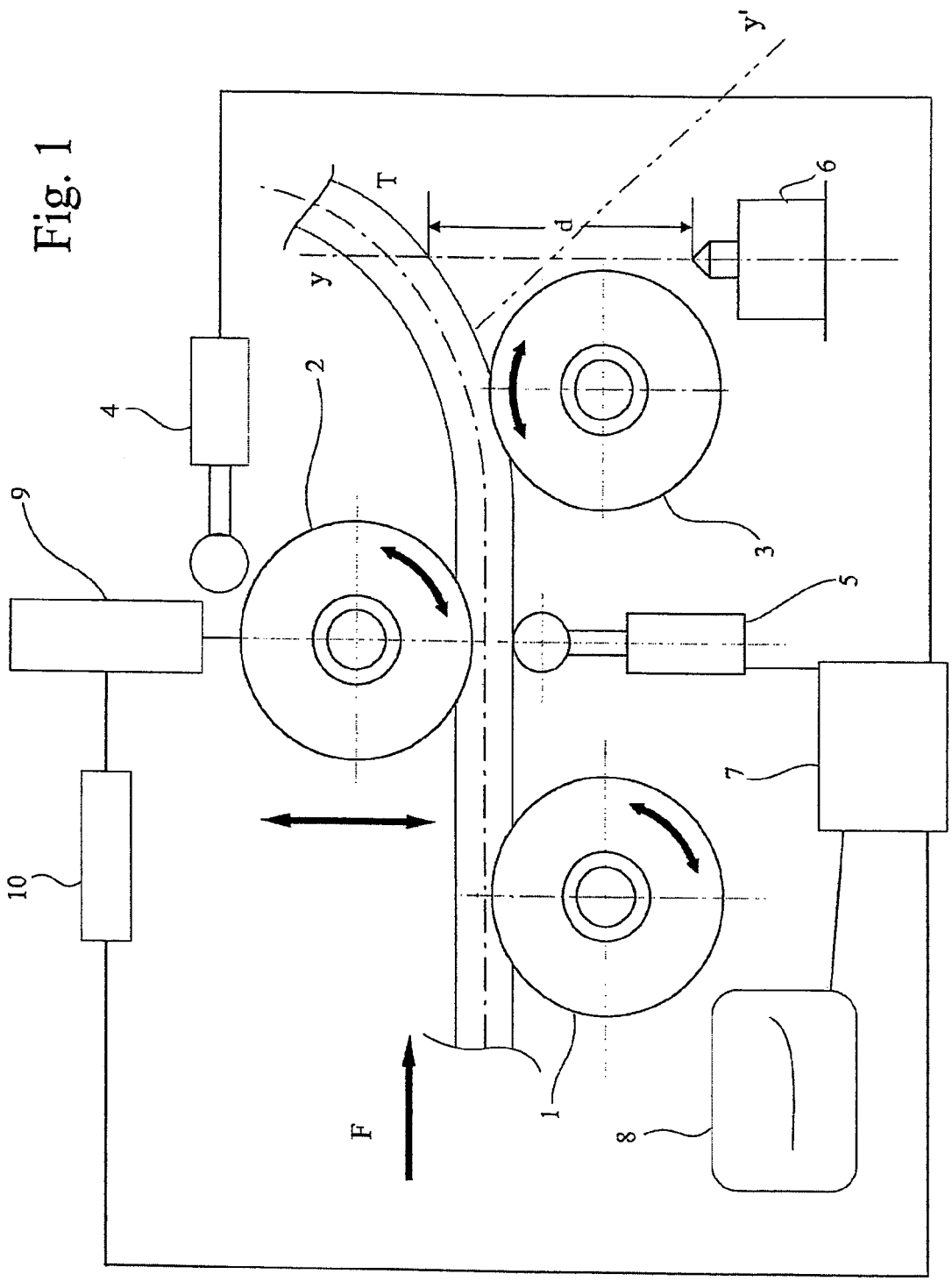
FIG. 1 shows very schematically and partially a side view of a roller bending machine in which the method to check and control a roller bending machine for continuously bending an elongated workpiece at variable curvature radii according to the present invention is embodied.

Referring firstly to FIG. 1, the machine on which the invention is embodied by way of example is a pyramidal bending and forming machine and comprises a series of three driving rollers 1, 2, and 3, at least one of them being a deforming roller. An elongated workpiece to be bent, e.g. a pipe T through the driving rollers along a direction indicated by an arrow F. For description convenience the rollers 1 and 3 are fixed in their position, while the roller 2 is adjustable in its vertical position and can be controlled by the machine to move on the base of a retroactive control in the vertical direction. An encoder 4 is associated to the vertically adjustable roller 2, and an encoder for measuring the displacement of the tube T through the series of rollers 1, 2, and 3, is indicated as 5.

A contact-free distance meter is indicated generally as 6, that is fixed in its position, e.g. including a laser transmitter, which provides a distance d with respect to the bend exiting the machine. An aiming direction y of the laser meter 6, as the contact-free distance meter will be called below, is shown for convenience vertical with respect to the plane of the sheet. However, the aiming direction can be selected also in dependence of the radius of the pipe exiting the roller 3, preferably in order to approach as near as possible the exit point from the roller 3, e.g. along the line that is indicated as y' in FIG. 1.

The machine according to the described diagram further comprises a central computer 7 for data controlling and processing, whose task is to create a correspondence between the machine movements and the bend drawing that can be graphically inserted through a video device 8, possibly also of a "touch screen" type. This correspondence occurs by means of a digital analog device I/O and a signal conditioner, which has the function of filtering and stabilising digital analog signals that arrive from various mechanical, hydraulic and electronic components of the machine. These components are known and then are not described, or they are described very generally.

A hydraulic cylinder 9 and a proportional valve 10 are parts of a system for displacing the roller 2, system which is controlled by the computer 7 in dependence of a detection of the encoder 4 against the horizontal pipe movement that is provided by the encoder 5 and in dependence of a detection of the bend that is provided by the encoder 4, the encoder 5 and the laser meter 6.

The machine can work without any check and retroaction in a manual way.

In this case, from a graphic/numerical design, for example through a drawing of a curve by means of known geometrical original curves, such as circle, ellipse, etc., a function describing a determined bend to be obtained on an elongated workpiece, such as a pipe or a bar, is obtained. From this function the whole length of the bend and the length of small sections or curve arcs and the correspondent value of the curvature radius.

For example, for the ellipse the perimeter is calculated by the formula YNOT (Roger Maertens, 2000) P=4 $(a^y+b^y)^{1/y}$ with y=logn(2)/logn($\pi$/2). For other original curves the calculation is more complex, such as for spline functions, where the calculation has to be made for intervals of definition of each polynomial. Thereof the length of the bar of material can be determined, that is necessary, for example, to obtain a desired bent workpiece. The ellipse will be used below as an example of feasibility as it is a compromise between the exaggerate simplicity of the circle and the calculation complexity for the other original curves.

In the following, lengths of arcs being parts of the wanted bend are calculated. These length are called "control points". A value of the radius of the osculator circle is associated to each control point. When making the example of the ellipse (in this case a calculation of the arcs between two angles has been chosen by using the Simpson's method to resolve the integral):

R=mayor half axis
r=minor half axis $$\Delta\phi=(\phi_2-\phi_1)\div 20;$$

$$y1=\sqrt{[(R\sin\phi_1)^2+(r\cos\phi_1)^2]}$$

$$y2=\sqrt{[(R\sin(\phi_1+\Delta\phi))^2+(r\cos(\phi_1+\Delta\phi))^2]}$$

$$y3=\sqrt{[(R\sin(\phi_1+2\times\Delta\phi))^2+(r\cos(\phi_1+2\times\Delta\phi))^2]}$$

$$y21=\sqrt{[(R\sin(\phi_1+20\times\Delta\phi))^2+(r\cos(\phi_1+20\times\Delta\phi))^2]}$$

$$P=(\Delta\phi\div 3)\times(y_1+4y_2+2y_3+4y_4+2y_5+\ldots+2y_{19}+4y_{20}+y_{21})=\text{arc length between }\phi_1\text{ and }\phi_2.$$

To each arc, that is a curve section, a radius that must be obtained by the following formula, yet with reference to the angle, is associated:

$$(R^2*\sin^2(\phi)+r^2*\cos^2(\phi))^{3/2}/(R*r).$$

Then, in the direction of the length of the bar to be bent, intervals equal to the bend sections or arcs of ellipse that one wants to obtain from the same bar are traced. The radius of the correspondent curve section of the ellipse is associated to each interval of the bar. During the operation, the machine will make the central roller 2 to be lowered and the bar to move so that each range of the bar reaches a height relevant to the correspondent curvature radius. Thus the process will be continued until the whole perimeter of the ellipse is covered.

When the retroaction according to the present invention is used, on the base of both the height change of the central roller 2 and the measurement of the laser meter 6, a succession of points belonging to the bend in successive detection is constructed.

The bend is defined through a succession of third order polynomial functions. Such functions, that are natural cubic splines, need at least three points to be mathematically defined. The points are obtained from both the position change of the central roller and the laser measurement. Then, given two points, the third point will result in a Cartesian diagram as a change of the curvature or of the angular coefficient of the chord as measured with respect to the precedent detection. The process of calculation of the spline functions assures a univocal solution by fixing a constraint of a value zero for the second derivative on the extreme points of the succession of points (among other, it is relevant that the connections of the pipe are on those points). The measurement method used permits variable-radius arcs to be measured and checked with precision starting from a single checking point. (Please refer to: http://en.wikipedia.org/wiki/Spline_interpolation, in particular paragraphs on "cubic spline interpolation", "minimality of the cubic splines" and "interpolation using natural cubic splines").

In the same way as for any other curve, of course, the process needs at least three points that are given by successive measurements in addition to the two constrains on the second derivative. At the end of the working process the curve is completely constructed on n points with extreme accuracy. Thus this method has not to be confused with the measurement method using a three point arc meter.

From the polynomials that are gradually constructed, the curvature radii in determined points x of the curve can be calculated. In each section, the curvature radius or radius of the osculator circle is calculated by the formula $$\rho[x] = \frac{(1 + (f'[x])^2)^{3/2}}{f''[x]}$$

Further, being known the values of the curvature radius with respect to x values, a curve can be defined univocally whose second derivative does not change in its sign, but in the machine operation, a change in concavity/convexity cannot occur.

In this way a result that is comparable with the work obtained by the initial graphic design can be obtained.

This is possible both during the working and in the conclusive result. It is sufficient to compare the values of the radii as obtained on the bar being worked with the radii of the curve sections of the initial graphic design. If these values match, a curve is going to be made exactly as from the design, otherwise a difference is calculated and a new height for a groove of the central roller is calculated again on dependence of said difference.

With reference to FIG. 2, a part of the machine in FIG. 1 is depicted in detail according to a constructive modification thereof. Instead of the free-contact distance meter 6, a contact distance meter 11 is used. This contact distance meter can be of any known type, for example tracer point or encoder, or other, provided that it can be used to measure continuously the distance of the pipe T being worked downstream the series of driving rollers. It is enough that the contact meter 11 is able to detect the distance of the pipe T with respect to a fixed point along a single direction. This direction can be selected in the most suitable way, for example along the directions y or y' as shown.

The machine according to the invention that has been described and depicted in its embodiment or in a modification thereof can operate in accordance with a variation of the method of the present invention. According to this variation the calculation of the curvature radius of each bend section of the elongated workpiece is executed to obtain an intermediate curvature radius of a bend section being formed during at least three successive instants, the intermediate curvature radius being between the curvature radius in a first one of at least three instants and the curvature radius in a last one of said at least three instants. This method is similar to that one using an arc meter, but it is embodied by a single laser meter or tracer-point meter in one direction.

The measurement and retroaction method above described can be applied as follows.

By knowing a single point of measurement, both an orientation of the bend as produced and any correction to be made when the material used is changed or mechanical modifications occur in the working phases, can be measured with accuracy.

The method permits the compensation both of errors due to the elastic characteristic of the material used and any electromechanical variation occurring when different components are used.

Using a proportionality coefficient depending on the elastic behaviour, coefficient that is calculated in a pre-setting step, increases the general precision of the system.

A fitting procedure of the elongated workpiece as controlled by the laser meter allows the waste of material in the production to be decreased automatically. The same procedure permits one person to decide autonomously the fitting length of the material. It is clear that all the errors due to the positioning of the material to be worked on the machine are annulled.

Further, the consequence of one reading point increases far the ease of operation of the machine.

The method allows a plurality of consecutive pipes to be worked in order to obtain very long arcs.

In the precedent description the machine being considered for embodying the method is a pyramidal ring roller in which the top driving roller is the deforming roller. Alternatively, the deforming roller is the exit roller of the machine.

It should be understood that other modifications and changes can be provided, all falling in the scope of the invention according to the enclosed claims.

The invention claimed is:

1. A method to check and control a roller bending machine for continuously bending an elongated workpiece at variable curvature radii, the roller bending machine using a series of driving rollers for bending, comprising:

measuring a distance of the elongated workpiece in one point that is situated downstream of said series of driving rollers for bending and lays in a direction of one distance meter, said distance measuring being executed to obtain a distance between said one point and a fixed position of the distance meter in successive instants;

calculating a curvature radius of each bend section of the elongated workpiece;

comparing the calculated curvature radius with a desired curvature radius in said bend section having a position and a length that is measured concentrically to the elongated workpiece by a length meter, and determining a difference between said calculated curvature radius and said desired curvature radius;

calculating a change of position to which an upstream roller has to be subjected in order to annul said difference between said calculated curvature radius and said desired curvature radius; and operating said upstream roller on a basis of said calculated change of position, wherein the machine bend is corrected while the actual radius of a section is being formed, and the bend section curvature radius is measured in successive instants while the actual bend radius in the elongated workpiece is being formed.

2. The method according to claim 1, wherein the calculation of the curvature radius of each bend section of the elongated workpiece is executed on a basis of a change of position, with respect to the elongated workpiece to be bent, of at least one roller of said series of rollers for bending, and of the distance measured by the distance meter.

3. The method according to claim 2, wherein a curve along which said elongated workpiece is bent is defined by a succession of third order polynomial functions, said functions being natural cubic splines, which need at least three points to be mathematically defined, said at least three points being obtained on the basis of the change of position with respect to the elongated workpiece to be bent, of a position of the roller variable, and of the distance measured by the distance meter, both constituting two points, the third point resulting in a Cartesian diagram as a change of the curvature or the angular coefficient of the chord as measured with respect to precedent detection.

4. The method according to claim 1, wherein the calculation of the curvature radius of each bend section of the elongated workpiece is the calculation of an intermediate curvature radius of a bend section that is formed during said at least three successive instants, said intermediate radius being comprised between the bend radius in a first of said at least three instants and the bend radius in a last one of said at least three instants.

5. A controlled machine for continuous bending an elongated workpiece (T) at variable curvature radii, the machine comprising: a series of driving rollers for bending (1, 2, 3);

one contact-free distance meter (6, 11) for measuring a distance of the elongated workpiece (T) that is situated downstream of said series of rollers for bending;

a computer (7) that is coupled to the distance meter (6, 11) for calculating a radius of a bend section on a basis of both the measurement of said distance in successive instants and comparison of the calculated curvature radius with a desired curvature radius in said bend section;

the computer (7) being coupled to a length meter (5) for measuring a length of said bend section concentrically to the elongated workpiece (T);

the computer (7) being coupled to means for operating (9, 10) adapted to operate a roller (2) of the series of driving rollers for bending (1, 2 3) in order to adjust the bending by means of a length meter (4) on a basis of a difference between said measured curvature radius and the desired curvature radius in said bend section, wherein the machine is configured so that the machine bend is corrected while the actual radius of a section is being formed, and the bend section curvature radius is measured in successive instants while the actual bend radius in the elongated workpiece is being formed.

6. The machine according to claim 5, wherein said distance meter (6) is a contact-free meter.

7. The machine according to claim 6, wherein said contact-free meter is a meter comprising a single laser transmitting in a single direction.

8. The machine according to claim 5, wherein said distance meter (11) is a contact meter in a single point and in a single direction.

9. The machine according to claim 5, wherein said length meters (4, 5) are an encoder.

10. The machine according to claim 5, wherein said distance meter (6, 11) is fixed in position in such a way that a measurement direction of the distance meter crosses the elongated workpiece near an exit roller of the machine.

11. A controlled machine for continuous bending an elongated workpiece at variable curvature radii, the machine comprising:

a series of driving rollers for bending;

one contact-free distance meter for measuring a distance of the elongated workpiece that is situated downstream of said series of rollers for bending;

a computer that is coupled to the distance meter for calculating a radius of a bend section on a basis of both the measurement of said distance in successive instants and comparison of the calculated curvature radius with a desired curvature radius in said bend section;

the computer being coupled to a length meter for measuring a length of said bend section concentrically to the elongated workpiece;

the computer being coupled to system for displacing a roller of the series of driving rollers for bending in order to adjust the bending by means of a length meter on a basis of a difference between said measured curvature radius and the desired curvature radius in said bend section, wherein the machine is configured so that the machine bend is corrected while the actual radius of a section is being formed, and the bend section curvature radius is measured in successive instants while the actual bend radius in the elongated workpiece is being formed.

12. The machine according to claim 11, wherein said distance meter is a contact-free meter.

13. The machine according to claim 12, wherein said contact-free meter is a meter comprising a single laser transmitting in a single direction.

14. The machine according to claim 11, wherein said distance meter is a contact meter in a single point and in a single direction.

15. The machine according to claim 11, wherein said length meters comprise an encoder.

16. The machine according to claim 11, wherein said distance meter is fixed in position in such a way that a measurement direction of the distance meter crosses the elongated workpiece near an exit roller of the machine.

17. The machine according to claim 11, wherein said system for displacing a roller of the series of driving rollers includes a hydraulic cylinder and a proportional valve.

* * * * *

UNITED STATES PATENT AND TRADEMARK OFFICE
CERTIFICATE OF CORRECTION

PATENT NO.       : 8,646,300 B2                                                              Page 1 of 1
APPLICATION NO.  : 12/867300
DATED            : February 11, 2014
INVENTOR(S)      : Caporusso et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this

Twenty-ninth Day of September, 2015

Michelle K. Lee
*Director of the United States Patent and Trademark Office*